(12) United States Patent
Hensley

(10) Patent No.: US 8,539,910 B1
(45) Date of Patent: Sep. 24, 2013

(54) USER-MOUNTED HUMMINGBIRD FEEDER

(76) Inventor: Theodore D. Hensley, Anderson, IN (US)

( * ) Notice: Subject to any disclaimer, the term of this patent is extended or adjusted under 35 U.S.C. 154(b) by 301 days.

(21) Appl. No.: 12/941,271

(22) Filed: Nov. 8, 2010

(51) Int. Cl.
*A01K 39/02* (2006.01)
*A01K 7/00* (2006.01)

(52) U.S. Cl.
USPC ........................................................... 119/72

(58) Field of Classification Search
USPC ................................................. 119/72, 72.5
IPC ....................... A01K 39/00, 39/02, 07/00, 39/01
See application file for complete search history.

(56) References Cited

U.S. PATENT DOCUMENTS

| | | |
|---|---|---|
| 3,292,589 A | 12/1966 | Williams |
| 3,913,527 A | 10/1975 | Kilham |
| D252,288 S | 7/1979 | Kilham |
| 4,691,665 A | 9/1987 | Hefner |
| 5,454,348 A | 10/1995 | Colwell et al. |
| 5,720,040 A * | 2/1998 | Simone ............................... 2/10 |
| 5,996,127 A | 12/1999 | Leslie |
| 6,012,414 A * | 1/2000 | Klein ................................ 119/72 |
| 6,247,205 B1 * | 6/2001 | Damadian et al. ............. 24/3.12 |
| 6,817,711 B2 * | 11/2004 | Schubert ........................ 351/155 |
| D536,839 S | 2/2007 | Colvin et al. |
| 7,634,974 B1 * | 12/2009 | Puckett et al. ................... 119/74 |
| 2004/0103851 A1 * | 6/2004 | Hunter .............................. 119/72 |
| 2006/0201431 A1 | 9/2006 | Peterson |
| 2008/0087225 A1 * | 4/2008 | Lin .................................... 119/72 |
| 2009/0308321 A1 * | 12/2009 | Szczygiel-Durante ......... 119/72 |
| 2010/0024738 A1 * | 2/2010 | Chen et al. ....................... 119/72 |

* cited by examiner

*Primary Examiner* — Son T Nguyen
*Assistant Examiner* — Shadi Baniani
(74) *Attorney, Agent, or Firm* — Montgomery Patent & Design; Robert C. Montgomery

(57) ABSTRACT

A hummingbird feeder attachable to a brim of a hat is intended to allow for the observation of hummingbirds from a close perspective is herein disclosed. The feeder apparatus comprises a tube having a consumable fluid, a feeding nozzle, and a perch. The feeder further comprises an extended arm providing a spring clamp which attaches to the hat brim. The feeder is positioned in front of the wearer's face, thereby allowing for close observation of the hummingbird while it feeds. Additionally, the brim clip is designed in the shape of a mouth piece allowing a user to anchor the feeder in his/her mouth.

17 Claims, 5 Drawing Sheets

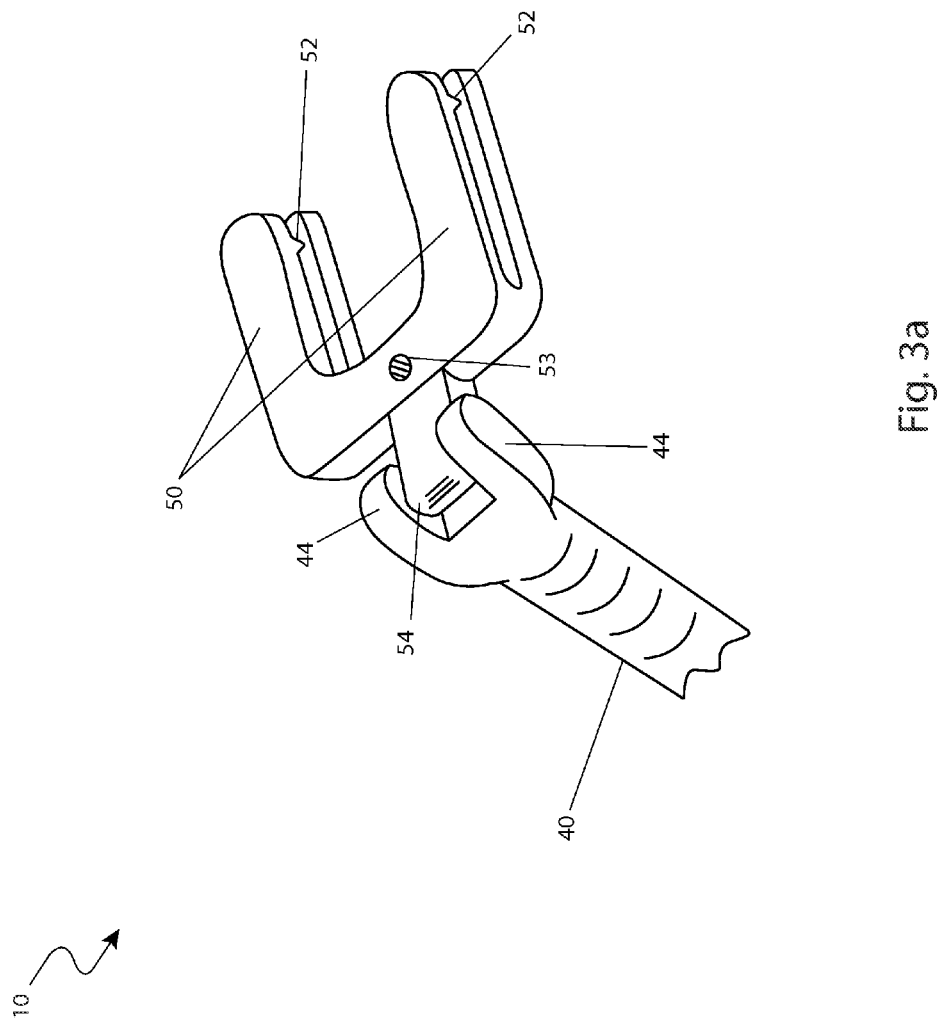

USER-MOUNTED HUMMINGBIRD FEEDER

RELATED APPLICATIONS

The present invention was first described in a notarized Official Record of Invention on Dec. 12, 2008, that is on file at the offices of Montgomery Patent and Design, LLC, the entire disclosures of which are incorporated herein by reference.

FIELD OF THE INVENTION

The present invention relates generally to bird feeders, and in particular, to a hummingbird feeder attachable to a user's person for close-up viewing of birds.

BACKGROUND OF THE INVENTION

Many people enjoy the presence of birds on their property and, in order to attract them, place bird feeders in their yards. These feeders not only attract the birds, but they also serve as a food source in the winter months when the birds' natural food sources are in short supply.

One (1) type of bird everyone enjoys seeing is the hummingbird. These birds are not only small and delicate, but they are capable of hovering in mid-air while feeding, and are simply amazing to observe. It is because of this fact that most hummingbird feeders are placed near windows of homes such that people can view these birds and their feeding habits up close. However, such feeders do not provide an intimate, unblocked close-up view of the birds.

Various attempts have been made to provide bird feeders which provide close-up, unfettered viewing of birds during feeding. U.S. Pat. No. 5,996,127, issued in the name of Leslie, describes a wearable device for feeding birds which comprises a helmet and a plurality of offset hanging bird feeding structures.

While these devices fulfill their respective, particular objectives, each of these references suffer from one (1) or more of the aforementioned disadvantages. Many such devices do not provide a sufficiently intimate view of a bird during feeding. Also, many such devices are cumbersome to assemble or operate or are uncomfortable to don. Furthermore, many such devices are not readily transportable and adjustable. Accordingly, there exists a need for a bird feeder without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a hummingbird feeder which is adjustable and portable and which provides a user with an intimate view of birds during feeding. Thus, the object of the present invention is to solve the aforementioned disadvantages and provide for this need.

To achieve the above objectives, it is an object of the present invention to comprise a user-mounted hummingbird feeder to allow for the observation of hummingbirds from a close perspective. The apparatus comprises a feeding tube assembly, a feeding nozzle, and an outwardly extending holding rod.

Another object of the present invention is to position the feeding tube assembly in front of the user's face for close observation of the hummingbirds during feeding.

Yet still another object of the present invention is to provide containment of a volume of fluid suitable for feeding hummingbirds, such as sugar water, in order to act as an attractant and feeder for the birds. The fluid is contained within a feeding tube portion of the feeding tube assembly.

Yet still another object of the present invention is to allowing hummingbirds to access fluid contained in the feeding tube assembly via the feeding nozzle. The feeding nozzle comprises a funnel-shaped nozzle located at a top end of the feeding tube assembly. The feeding nozzle further comprises an internal orifice accessible by a long beak of the hummingbird.

Yet still another object of the present invention is to attract hummingbirds to the feeding nozzle. The nozzle further comprises an attractive decorative hollow appendage and a colorful façade such as a flower or a circular disc.

Yet still another object of the present invention is to enable attachment of the apparatus to a hat of the user. The holding rod comprises a brim mounting clip at a top end which provides a clamping fit to the brim of the hat.

Yet still another object of the present invention is to provide additional securement of the holding rod to the user's hat with a securing clip bard located along an inner surface of the brim mounting clip.

Yet still another object of the present invention is to allow the user to selectively adjust the vertical position of the feeding tube assembly by motioning one (1) of a plurality of adjustable pivoting members located at each end portion of the holding rod.

Yet still another object of the present invention is to allow the user to selectively remove the feeding tube from the holding rod for purposes such as filling or cleaning. The feeding tube is slidingly removable and insertable within a centrally located circular collar aperture located at a bottom end of the holding rod.

Yet still another object of the present invention is to allow a user to support the apparatus with their mouth. The brim mounting clip comprises a "U"-shape which enables a comfortable mouthpiece type use of the brim mounting clip for alternate viewing of the birds during feeding.

Yet still another object of the present invention is to provide a method of utilizing the device that provides a unique means of filling the feeding tube with a feeding fluid, inserting the feeding nozzle into the feeding tube, inserting the feeding tube into the collar aperture of the holding rod, attaching the holding rod to a brim portion of a hat with the brim mounting clip, adjusting the vertical position of the feeding tube assembly relative to the hat by motioning the adjustable pivoting members of the holding rod, donning the hat, observing a bird during feeding, and selectively supporting the apparatus by placing the brim mounting clip in the user's mouth.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3a is a close-up view of a second pivoting member 54 of the user-mounted hummingbird feeder 10 depicting an engaged state thereof, according to a preferred embodiment of the present invention;

DESCRIPTIVE KEY

Figure 1:
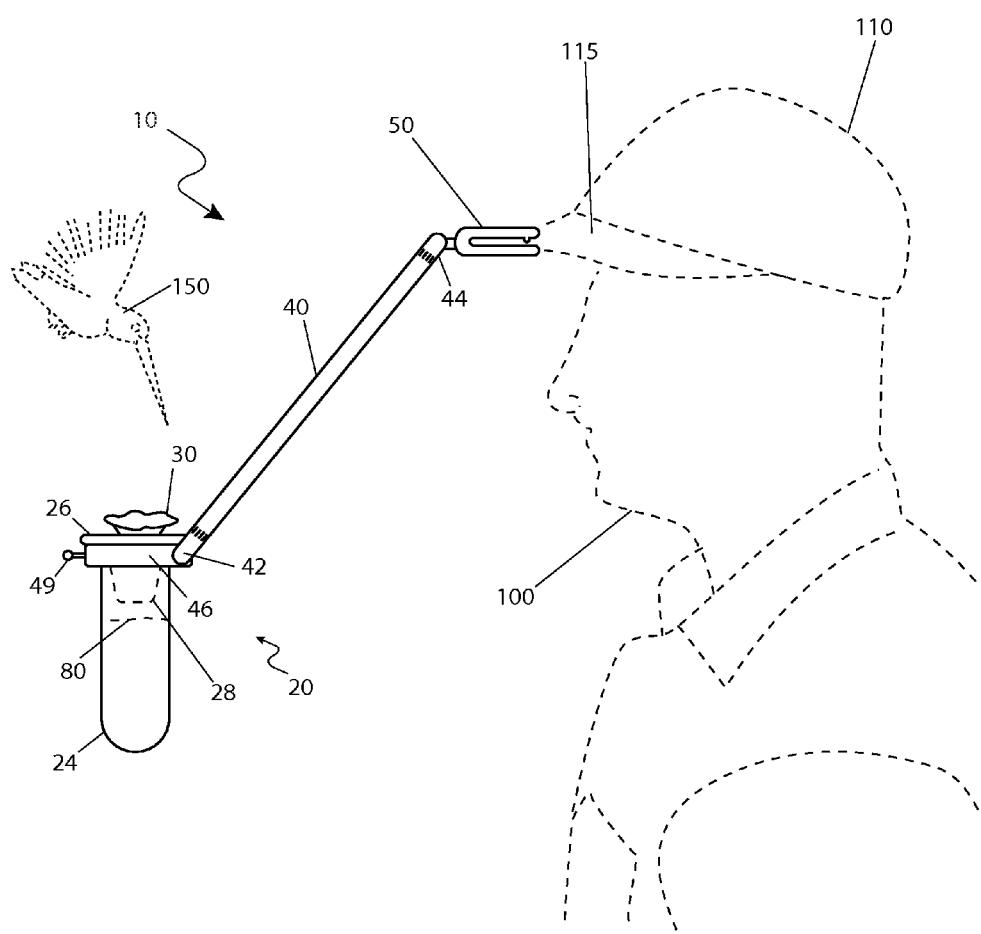
FIG. 1 is a side environmental view of a user-mounted hummingbird feeder 10 depicting usage upon a hat 110, according to a preferred embodiment of the present invention.

| | |
|---|---|
| 10 | user-mounted hummingbird feeder |
| 20 | feeding tube assembly |
| 24 | feeding tube |
| 26 | rim |
| 28 | stopper |
| 29 | stopper orifice |
| 30 | feeding nozzle |
| 31 | nozzle orifice |
| 40 | holding rod |
| 42 | first holding rod connector |
| 43 | indentation |
| 44 | second holding rod connector |
| 45 | first pivoting member |
| 46 | collar |
| 48 | collar aperture |
| 49 | perch |
| 50 | brim mounting clip |
| 52 | clip barb |
| 53 | mounting aperture |
| 54 | second pivoting member |
| 56 | protuberance |
| 80 | fluid |
| 100 | user |
| 110 | hat |
| 115 | brim |
| 120 | mouth |
| 150 | hummingbird |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a user-mounted hummingbird feeder (herein described as the "apparatus") 10, attachable to a brim 115 of a hat 110 and intended to allow for the observation of hummingbirds 150 from a close perspective. The apparatus 10 comprises a feeding tube assembly 20, a feeding nozzle 30 designed to attract a hummingbird 150, and an outwardly extending holding rod 40 which may be clipped thereto a brim 115 portion of the hat 110 or held in a user's 100 mouth 120. The apparatus 10 is positioned in front of a facial area of a user 100, thereby allowing for close observation of the hummingbird 150 during feeding.

Referring now to FIG. 1, a side environmental view of the apparatus 10 depicting usage upon a hat 110, according to a preferred embodiment of the present invention, is disclosed. The apparatus 10 comprises a feeding tube assembly 20 further comprising a feeding tube 24, and a feeding nozzle 30. The apparatus 10 also comprises a holding rod 40 and a brim mounting clip 50.

The feeding tube 24 provides containment of a volume of fluid 80 such as a sugar water solution or other nectar imitating fluids used in feeding of hummingbirds 150 in a conventional manner. The feeding tube assembly 20 comprises a top-mounted funnel-shaped feeding nozzle 30 which provides an internal nozzle orifice 31 allowing the hummingbird 150 to access the fluid 80 located in a subjacent feeding tube 24 using its long narrow beak (see FIG. 2). The feeding tube 24 provides an attachment means to an extending holding rod 40 being approximately twelve (12) inches long which enables attachment of the apparatus 10 to a brim portion 115 of a hat 110, or similar hat feature, worn upon a user's 100 head. The holding rod 40 positions the feeding tube 24 at a position, preferably in front of the user's 100 facial area, thereby allowing close-up viewing of the hummingbird 150 as it feeds in a normal manner. Additionally, the holding rod 40 provides enhanced positioning of said feeding tube 24 in relation to the user's 100 face, via adjustable pivoting members located at each end portion of said holding rod 40, thereby enabling variable vertical positioning of said feeding tube 24 (see FIG. 2). The brim mounting clip 50 comprises a plastic one-piece molded clamping fixture, thereby allowing secure mounting of the apparatus 10 thereto a brim portion 115 of the brimmed hat 110.

Figure 2:
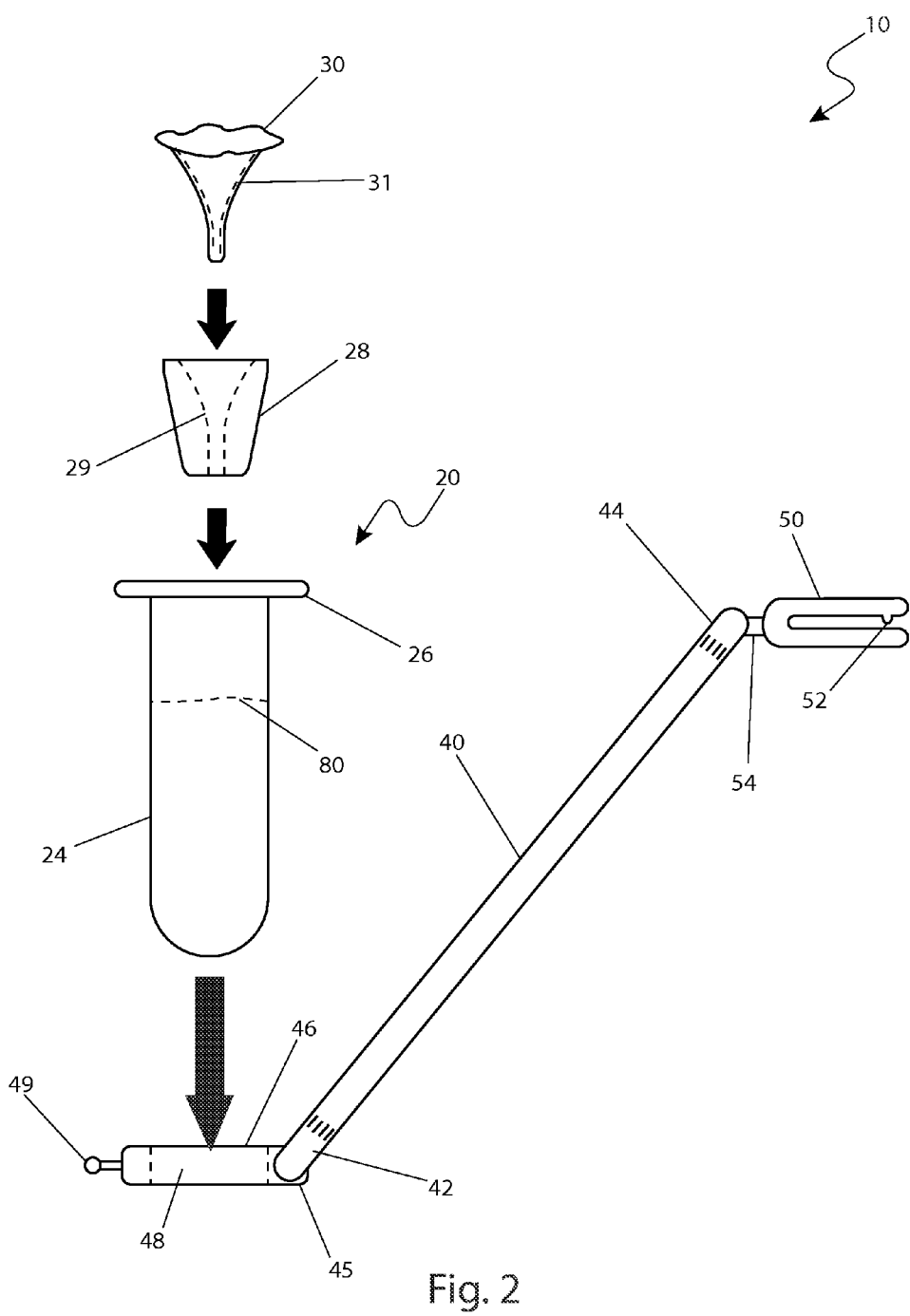
FIG. 2 is an exploded view of the user-mounted hummingbird feeder 10, according to a preferred embodiment of the present invention.

Referring now to FIG. 2, an exploded view of the hummingbird feeder with cap mount 10, according to a preferred embodiment of the present invention, is disclosed. The feeding tube assembly portion 20 of the apparatus 10 comprises a feeding tube 24, a stopper 28, and a feeding nozzle 30. The feeding tube 24 comprises a plastic or glass cylindrical-shaped container having a perpendicularly extending rim portion 26 along a top perimeter edge being similar thereto a test-tube and being approximately two (2) to four (4) inches long having a round open top region allowing secure attachment of a tapered rubber or plastic stopper 28 into. The stopper 28 in turn provides an attachment means to the feeding nozzle 30 being inserted into an integrally-molded stopper orifice portion 29 formed along a vertical center of the stopper 28. The feeding nozzle 30 comprises an attractive decorative hollow appendage which extends upwardly having a funnel shape. The feeding nozzle 30 is envisioned to be made of colorful plastic being shaped like a flower, a circular disc, or the like, thereby effectively luring the hummingbird 150 thereto the apparatus 10.

The holding rod 40 comprises a linear member approximately twelve (12) inches long and approximately one-quarter (¼) of an inch in diameter. The holding rod 40 further comprises a first holding rod connector 42 which provides pivoting attachment to a collar 46 at a lower end portion thereof and a second holding rod connector 44 which provides pivoting attachment thereto a second pivoting member portion 54 of the brim mounting clip 50 at an upper end portion (see FIGS. 3a and 3b).

The collar 46 comprises a ring-shaped member which provides removable attachment thereto the feeding tube 24 via insertion of said feeding tube 24 into a centrally located circular collar aperture 48 being particularly sized so as to slidingly receive said feeding tube 24 through. Upon being completely engaged downwardly into the collar 46, the rim portion 26 of the feeding tube 24 supportingly comes into contact with a top surface portion of said collar 46. The collar 46 further comprises a perch 49 and a first pivoting member 45 protruding horizontally from opposing outer vertical surfaces of said collar 46 being integrally-molded into said collar 46. The perch 49 comprises a "T"-shaped horizontal appendage on which a hummingbird 150 may stand, thereby being positioned for feeding from the aforementioned feeding nozzle 30.

The brim mounting clip 50 comprises a "U"-shaped clamping fixture extending in a horizontal plane and having an interior gap which emulates a profile of a cap brim 115, thereby allowing secure mounting to. The brim mounting clip 50 further comprises a securing clip barb 52 along an inner surface to grip the cap brim 115 surface. The brim mounting clip 50 also comprises a second pivoting member 54 which provides attachment of the brim mounting clip 50 thereto the holding rod 40 (see FIGS. 3a and 3b).

Figure 3B:
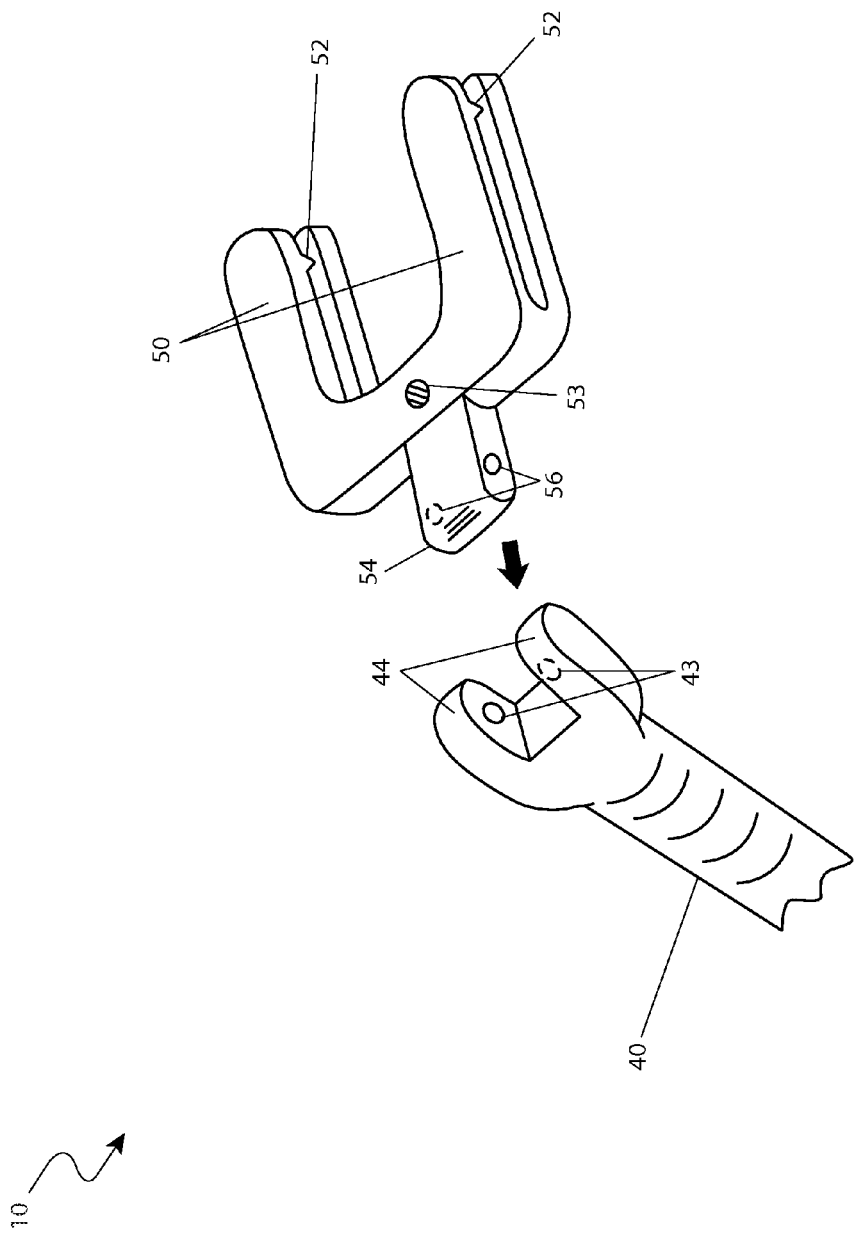
FIG. 3b is a close-up view of a second pivoting member 54 of the user-mounted hummingbird feeder 10 depicting a disengaged state thereof, according to a preferred embodiment of the present invention; and, FIG. 4 is a side environmental view of the user-mounted hummingbird feeder 10 depicting usage within a user's 100 mouth 120, according to a preferred embodiment of the present invention.

Referring now to FIGS. 3a and 3b, a close-up view of a second pivoting member 54 of the apparatus 10 depicting engaged and disengaged states, according to a preferred embodiment of the present invention, are disclosed. The holding rod 40 provides a three-piece hinging assembly providing an angularly adjustable attachment at opposing end portions, thereto the collar 46 and brim mounting clip 50, thereby providing single-axis motioning along a vertical plane. The lower end of the holding rod 40 comprises a first holding rod connector 42 being in mechanical communication with a first pivoting member portion 45 of the collar 46. In like manner, the other end portion of the holding rod 40 comprises a second holding rod connector 44 being in mechanical communication with the respective second pivoting member 54 portion of the brim mounting clip 50.

Although said first 42 and second 44 holding rod connectors comprise identical form and function, for simplicity sake, only the attachment of the second holding rod connector 44 and the second pivoting member 54 are illustrated here. The rotational relationship between said second holding rod connector 44 and the second pivoting member 54 is accomplished via integrally-molded and interlocking features comprising opposing protuberance portions 56 of the second pivoting member 54 and correspondingly shaped and positioned indentation portions 43 of the second holding rod connector 44 as seen in FIG. 3b. The protuberances 56 and corresponding indentations 43 comprise interlocking hemispherical shapes arranged along a common horizontal axis, thereby allowing arcuate vertical motioning of the holding rod 40. Furthermore, it is envisioned that the second holding rod connector 44 is to be formed so as to apply a pinching interference fit with the included second pivoting member 54 to provide a friction-holding effect, thereby securing the holding rod 40 in position following manual adjustment thereof. However, it is envisioned that other means of securing an included angle between said second holding rod connector 44 and second pivoting member 54 may be utilized in addition to the preferred embodiment illustrated here, and therefore should not be interpreted as a limiting factor of the apparatus 10.

The brim mounting clip 50 provides a means to mount the apparatus 10 upon a stationary structure such as a wall, railing, post, or the like using a nail or screw via an integrally-molded mounting aperture 53 centrally located upon said brim mounting clip 50 and adjacent to the second pivoting member 54.

Figure 4:
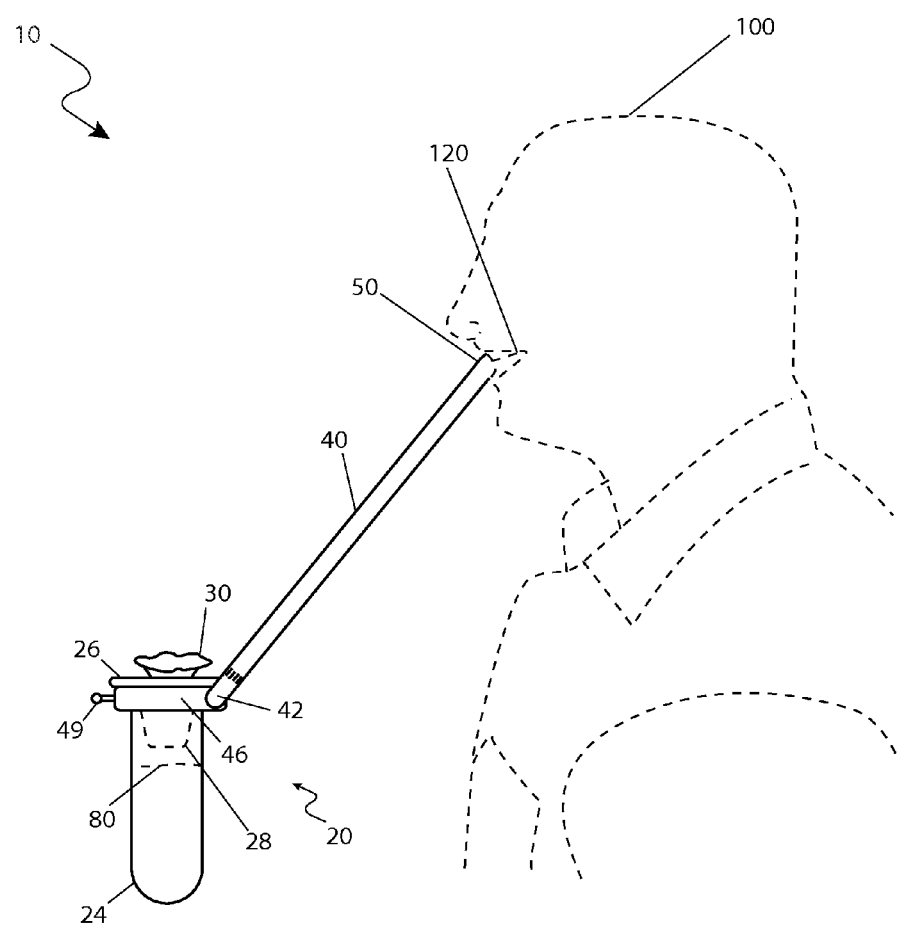

The "U"-shape of the brim mounting clip 50 allows a user 100 to alternately hold said clip 50 within their mouth 120 (see FIG. 4). The brim mounting clip 50 is similar in shape as popular mouthpieces used for sporting activities such as football, being comfortably held between a user's 100 teeth in a conventional manner.

Referring now to FIG. 4, a side environmental view of the apparatus 10 depicting usage within a user's 100 mouth 120 according to a preferred embodiment of the present invention, is disclosed. The previously described brim mounting clip 50 provides an additional hummingbird 150 feeding experience by allowing a user 100 to secure the apparatus 10 within their mouth 120.

It is envisioned that other styles and configurations of the present invention can be easily incorporated into the teachings of the present invention, and only one particular configuration shall be shown and described for purposes of clarity and disclosure and not by way of limitation of scope.

The present invention can be utilized by the common user in a simple and effortless manner with little or no training. After initial purchase or acquisition of the apparatus 10, it would be utilized as indicated in FIGS. 1 and 4.

The method of utilizing the preferred embodiment of the apparatus 10 may be achieved by performing the following steps: preparing a volume of hummingbird feeding fluid 80 such as sugar water solution or other nectar imitation fluid; pouring a desired quantity of said fluid 80 into the feeding tube 24; inserting the feeding nozzle 30 into the stopper 28 until obtaining a snug fit; inserting the stopper 28 into the open-top portion of said feeding tube 24 until snug; attaching the holding rod 40 and attached collar 46 thereto a brim portion 115 of a user's hat 110 using the attached brim mounting clip 50; inserting the feeding tube assembly 20 into the collar aperture portion 48 of the collar 46 until the rim portion 26 of the feeding tube 24 makes contact with the collar 46; adjusting the attitude and angle of the holding rod 40 to motion the feeding tube assembly 20 thereto a desired position; occupying an outdoor area being frequented by hummingbirds 150 while giving care to hold the apparatus 10 as still as possible upon the brimmed hat 110; allowing one (1) or more hummingbirds 150 to feed from the feeding nozzle 30 as desired or until the fluid 80 is depleted; repeating the above fluid 80 preparation and hummingbird 150 feeding activity as desired; and, enjoying an enhanced hummingbird 150 feeding experience afforded a user 100 of the present invention 10.

The apparatus 10 may also be alternately utilized being held therein a user's 100 mouth 120 by biting down upon said brim mounting clip 50 and feeding the hummingbirds 150 as previously described above, using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An attachable bird feeder, comprising:
   a feeding tube assembly, further comprising:
      a top-mounted funnel-shaped feeding nozzle having an internal nozzle orifice;
      a feeding tube in fluid communication with said nozzle orifice, comprising an upper aperture, an interior reservoir, and a rim around an upper perimeter edge; and,
      a stopper, comprising a bottom portion removably inserted into said upper aperture, an upper portion outwardly tapering from said bottom portion for removably receiving said feeding nozzle, and an interior orifice having a size and shape corresponding to that of said feeding nozzle;
      wherein said feeding nozzle extends downward through said interior orifice of said stopper for fluid communication with said reservoir of said feeding tube; and,
      wherein said feeding tube holds said amount of feeding medium; and,
   an outwardly extending mounting assembly for removably supporting said feeding tube assembly, said mounting assembly removably attachable to a support structure;
   wherein said feeding tube assembly holds an amount of feeding medium accessible by at least one bird;
   wherein said mounting assembly pivotally adjusts said feeding tube assembly relative to said support structure; and,
   wherein said bird feeder is attachable to said support structure and intended to allow for a close observation of said at least one bird feeding at said bird feeder.

2. The attachable bird feeder of claim 1, wherein said feeding tube further comprises a transparent cylindrical-shaped container approximately two to four inches in length.

3. The attachable bird feeder of claim 1, wherein said feeding nozzle further comprises a decorative and colorful funnel-shaped body.

4. The attachable bird feeder of claim 3, wherein said feeding nozzle further comprises a decorative flower.

5. The attachable bird feeder of claim 1, wherein said mounting assembly further comprises:
   a holding rod, comprising a first holding rod connector at a first end and a second holding rod connector at a second end opposite said first end, said first holding rod connector and said second holding rod connector each further comprise a forked member having a pair of indentations located on opposing inner side walls;
   a collar pivotally mounted to said first holding rod connector via a first pivoting member;
   a mounting clip pivotally mounted to said second holding rod connector via a second pivoting member;
   wherein said collar supports said feeding tube assembly;
   wherein said collar is pivotally adjustable relative to said holding rod;
   wherein said mounting clip mounts said bird feeder to said support structure; and,
   wherein said mounting clip is pivotally adjustable relative to said holding rod.

6. The attachable bird feeder of claim 5, wherein said holding rod further comprises a linear member approximately twelve inches in length and approximately one-quarter of an inch in diameter.

7. The attachable bird feeder of claim 5, wherein said collar further comprises:
   a ring-shaped member having a collar aperture;
   a horizontal perch located at a first horizontal side of said collar and protruding outwardly therefrom; and,
   said first pivoting member located on an opposite side of said perch and protruding outwardly therefrom, said first pivoting member further comprising a pair of opposing protuberances engaging said pair of indentations of said first holding rod connector;
   wherein said feeding tube assembly is inserted into said collar aperture; and,
   wherein said rim of said feeding tube rests upon an upper surface of said collar.

8. The attachable bird feeder of claim 5, wherein said mounting clip further comprises:
   a "U"-shaped clamping fixture body extending in a horizontal plane, comprising a centrally-located interior gap bisecting an upper portion and a lower potion, said interior gap horizontally extending rearwardly from a leading edge and terminating prior to a rear edge;
   a pair of barbs extending downward from an inner surface of said upper portion on opposing arms of said clamping fixture body adjacent to said leading edge;
   said second pivoting member protruding outwardly from said rear edge of said clamping fixture body, said second pivoting member further comprising a pair of opposing protuberances engaging said pair of indentations of said second holding rod connector; and,
   a mounting fastener aperture centrally located on a rear connecting arm of said clamping fixture body;
   wherein said support structure is inserted into said interior gap;
   wherein said pair of barbs secures said mounting clip to said support structure; and,
   wherein said mounting fastener aperture receives a fastener for providing an alternate mounting means for said mounting clip to another support structure.

9. A hummingbird feeder removably supported on a user, comprising:
   a feeding tube assembly, further comprising:
      a top-mounted funnel-shaped feeding nozzle having an internal nozzle orifice;
      a feeding tube in fluid communication with said nozzle orifice, comprising an upper aperture, an interior reservoir, and a rim around an upper perimeter edge; and,
      a stopper, comprising a bottom portion removably inserted into said upper aperture an upper portion outwardly tapering from said bottom portion for removably receiving said feeding nozzle, and an interior orifice having a size and shape corresponding to that of said feeding nozzle;
      wherein said feeding nozzle extends downward through said interior orifice of said stopper for fluid communication with said reservoir of said feeding tube; and,
      wherein said feeding tube holds an amount of feeding medium accessible by at least one hummingbird; and,
   an outwardly extending mounting assembly for removably supporting said feeding tube assembly, said mounting assembly removably attachable to said user;
   wherein said mounting assembly pivotally adjusts said feeding tube assembly relative to said support structure; and,
   wherein said hummingbird feeder is attachable to said user and intended to allow for a close observation of said at least one hummingbird feeding at said hummingbird feeder.

10. The hummingbird feeder of claim 9, wherein said feeding tube further comprises a transparent cylindrical-shaped container approximately two to four inches in length.

11. The hummingbird feeder of claim 10, wherein said feeding nozzle further comprises a decorative and colorful funnel-shaped body.

12. The hummingbird feeder of claim 11, wherein said feeding nozzle further comprises a decorative flower.

13. The hummingbird feeder of claim 9, wherein said mounting assembly further comprises:
- a holding rod, comprising a first holding rod connector at a first end and a second holding rod connector at a second end opposite said first end, said first holding rod connector and said second holding rod connector each further comprise a forked member having a pair of indentations located on opposing inner side walls;
- a collar pivotally mounted to said first holding rod connector via a first pivoting member;
- a brim mounting clip pivotally mounted to said second holding rod connector via a second pivoting member;
- wherein said collar supports said feeding tube assembly;
- wherein said collar is pivotally adjustable relative to said holding rod;
- wherein said brim mounting clip mounts said hummingbird feeder to a brim of a cap worn by said user; and,
- wherein said brim mounting clip is pivotally adjustable relative to said holding rod.

14. The hummingbird feeder of claim 13, wherein said holding rod further comprises a linear member approximately twelve inches in length and approximately one-quarter of an inch in diameter.

15. The hummingbird feeder of claim 13, wherein said collar further comprises:
- a ring-shaped member having a collar aperture;
- a horizontal perch located at a first horizontal side of said collar and protruding outwardly therefrom; and,
- said first pivoting member located on an opposite side of said perch and protruding outwardly therefrom, said first pivoting member further comprising a pair of opposing protuberances engaging said pair of indentations of said first holding rod connector;
- wherein said feeding tube assembly is inserted into said collar aperture; and,
- wherein said rim of said feeding tube rests upon an upper surface of said collar.

16. The hummingbird feeder of claim 13, wherein said brim mounting clip further comprises:
- a "U"-shaped clamping fixture body extending in a horizontal plane, comprising a centrally-located interior gap bisecting an upper portion and a lower potion, said interior gap horizontally extending rearwardly from a leading edge and terminating prior to a rear edge;
- a pair of barbs extending downward from an inner surface of said upper portion on opposing arms of said clamping fixture body adjacent to said leading edge;
- said second pivoting member protruding outwardly from said rear edge of said clamping fixture body, said second pivoting member further comprising a pair of opposing protuberances engaging said pair of indentations of said second holding rod connector; and,
- a mounting fastener aperture centrally located on a rear connecting arm of said clamping fixture body;
- wherein said brim of said cap is inserted into said interior gap;
- wherein said pair of barbs secures said mounting clip to said brim of said cap; and,
- wherein said mounting fastener aperture receives a fastener for providing an alternate mounting means of said brim mounting clip to another support structure.

17. The hummingbird feeder of claim 16, wherein said brim mounting clip resembles a mouthpiece for insertion into and securing of said brim mounting clip within a mouth of said user.

* * * * *